United States Patent

[11] 3,607,801

| [72] | Inventor | Michael Fulton |
| | | Cowbridge, Glamorgan, Wales |
| [21] | Appl. No. | 842,333 |
| [22] | Filed | July 16, 1969 |
| [45] | Patented | Sept. 21, 1971 |
| [73] | Assignee | Midland Silicones Limited |
| | | Reading, Berkshire, England |
| [32] | Priority | July 22, 1963 |
| [33] | | Great Britain |
| [31] | | 34,893/68 |

[54] ORGANOPOLYSILOXANE COMPOSITIONS
4 Claims, No Drawings

[52] U.S. Cl. .................................................. 260/18 S,
260/37 SB, 260/46.5 G, 260/825
[51] Int. Cl. ........................................................ C08g 31/09
[50] Field of Search ............................................. 260/18 SI,
46.5 G, 825

[56] References Cited
UNITED STATES PATENTS

| 2,927,907 | 3/1960 | Polmanteer | 260/18 |
| 3,127,363 | 3/1964 | Nitzsche et al. | 260/825 |
| 3,161,614 | 12/1964 | Brown et al. | 260/46.5 |
| 3,305,502 | 2/1967 | Lampe | 260/18 |
| 3,324,058 | 6/1967 | Scott | 260/18 |
| 3,355,480 | 11/1967 | Di Paola | 260/18 |

Primary Examiner—Donald E. Czaja
Assistant Examiner—Eugene C. Rzucidlo
Attorneys—Robert F. Fleming, Jr. and Laurence R. Hobey ABSTRACT: The tin carboxylate catalyst employed in room temperature vulcanizing silicone rubber systems based on hydroxyl endblocked diorganosiloxanes and silicate crosslinking agents is admixed with polyalkoxysilyl endblocked diorganosiloxane fluids for ease and accuracy of measurement and mixing.

ORGANOPOLYSILOXANE COMPOSITIONS

This invention relates to compositions vulcanizable to silicone elastomers and to elastomers obtained by vulcanizing such compositions.

Organopolysiloxane compositions which vulcanize at room temperature are now well known and have achieved considerable commercial success as, for example, coating, caulking, sealing and molding materials. One widely employed type of composition having the property of vulcanizing at ambient temperatures comprises a mixture of a diorganopolysiloxane-containing terminal silicon-bonded reactive groups, a cross-linking agent, for example, an alkyl silicate or an alkyl polysilicate and a condensation catalyst. This type of composition is described in U.S. Pat. Nos. 2,927,907 and 3,127,363, among others. Vulcanization of such compositions occurs on mixing the three essential components. To avoid premature vulcanization during storage or transport, it has become the practice to supply the compositions in two packages, which are mixed just prior to use. In such two-package compositions the diorganopolysiloxane is packaged separately from the condensation catalyst. The cross-linking agent can be included with either package or divided between both.

The proportion of condensation catalyst employed to effect the cure of such systems is normally very small relative to the other components and consequently difficulties are associated with the accurate measurement of the catalyst component and its homogeneous dispersion in the diorganopolysiloxane composition. Increasing the catalyst bulk by combining the catalyst and alkyl silicate and/or polysilicate cross-linking agent is not a satisfactory method of overcoming the difficulty; the quantity of such cross-linker required for vulcanization being usually too small to contribute to the catalyst bulk to the desired extent. It has been proposed to use a trialkyl- or triaryl-end-blocked diorganopolysiloxane as a carrier for the catalyst. Although such a method facilitates measuring of the catalyst component, and mixing of the two packages, the diorganopolysiloxane is chemically inert and therefore does not take part in the cross-linking reaction. Because of its inert nature, the end-blocked diorganopolysiloxane exudes from the surface of the composition following vulcanization. The trialkyl- or triaryl-end-blocked polydiorganosiloxanes are also incompatible with the tin carboxylates which represent the preferred vulcanization catalysts. The preparation of the catalyst composition has therefore required the use of a compatibilizing solvent, thickener or suspension agent to impart some homogeneity to the composition. The use of solvents is, however, often undesirable and the filled catalyst compositions have suffered from the disadvantage that they are not suitable for use when the vulcanized product is required to be transparent.

We have now found that the above recited disadvantages can be eliminated by including with the catalyst component a diorganopolysiloxane in which the terminal silicon atoms have alkoxy radicals attached thereto. The diorganopolysiloxane acts as a satisfactory diluent for the catalyst and is also capable of taking part in the cross-linking reaction during vulcanization so that it is chemically retained in the vulcanized material. Further, the lower molecular weight alkoxylated diorganopolysiloxanes are also solvents for carboxylic acid compounds of tin which are commonly employed as catalysts with two component elastomer forming compositions and are also capable of functioning as the sole cross-linking agent for vulcanization. The use of the alkoxylated diorganopolysiloxanes thus permits the preparation of substantially colorless or transparent vulcanizates and, when desired, enables vulcanization to be carried out in the absence of conventional cross-linking materials.

Accordingly, this invention provides a room temperature vulcanizable composition which is made up into two separately packaged parts ready for mixing together before use, one part comprising (1) a diorganopolysiloxane containing terminal silicon-bonded hydroxyl radicals, and the other comprising (2) a carboxylic acid salt of tin, and (3) at least one diorganopolysiloxane having terminal groups of the general formula -SiR$_a$(OR')$_{3-a}$ wherein $a$ has a value of 0 or 1, R' is an alkyl radical containing less than 7 carbon atoms or an alkoxy alkyl radical of less than 7 carbon atoms and R represents a monovalent hydrocarbon radical, monovalent halogenated hydrocarbon radical or cyanoalkyl radical.

The invention also includes a process for the preparation of a room temperature vulcanizable organopolysiloxane composition which comprises mixing the components (1), (2) and (3) above.

Hydroxyl-terminated diorganopolysiloxanes which are employed as component (1) of the compositions of this invention are well-known materials and can be any of those known to be suitable for use in the formulation of two-part room temperature vulcanizing compositions. Such materials can be described as substantially linear diorganopolysiloxanes containing on average two, or approximately two, terminal silanol (-SiOH) groups per molecule.

The silicon-bonded radicals present in the diorganopolysiloxane are selected from monovalent hydrocarbon radicals, monovalent halogenated hydrocarbon radicals and cyanoalkyl radicals. Examples of the organic radicals which can be present therefore are alkyl radicals such as methyl, ethyl, propyl, butyl, dodecyl and octadecyl radicals; alkenyl radicals such as vinyl, allyl and cyclohexenyl; aryl radicals such as phenyl and naphthyl; halogenated hydrocarbon radicals such as chlorophenyl, bromomethyl and trifluoropropyl radicals and cyanoalkyl radicals such as cyanomethyl and cyanopropyl radicals.

The hydroxylated diorganopolysiloxanes can vary in viscosity from freely flowing liquids to barely flowing gums. Preferably, however, the viscosity of the diorganopolysiloxane lies within the range from 500 to 10,000 cs. at 25° C. Most preferred as the hydroxylated diorganopolysiloxanes are the alpha, omega-dihydroxy-diorganopolysiloxanes represented by the general formula

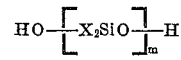

wherein X represents the methyl, ethyl, phenyl, vinyl or 3,3,3-trifluoropropyl radical and $m$ has a value such that the viscosity of the diorganopolysiloxane has a viscosity within the range from 500 to 10,000 cs. at 25°C.

Ingredient (2) is a carboxylic acid salt of tin, the term "carboxylic acid salt" including those compounds having one or more hydrocarbon radicals linked to tin via a tin-carbon bond. Examples of such tin compounds are stannous acetate, stannous octoate, stannous naphthenate, dibutyltin diacetate, dibutyltin dilaurate and dioctyltin diacetate.

Component (3) of the compositions of this invention is a diorganopolysiloxane which is characterized by having two or three alkoxy radicals or alkoxyalkoxy radicals (e.g., CH$_3$OCH$_2$CH$_2$O- and CH$_3$CH$_2$OCH$_2$CH$_2$O-) attached to each terminal silicon atom in the molecule. Such diorganopolysiloxanes include, for example, those having the general formula

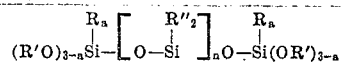

wherein each $a$ has the value of 0 or 1, R' is an alkyl radical containing less than 7 carbon atoms or an alkoxy alkyl radical containing less than 7 carbon atoms each R and R'' are selected from monovalent hydrocarbon radicals, monovalent halogenated hydrocarbon radicals and cyanoalkyl radicals and $n$ has an average value of at least 5. When $a$ is 1, R preferably represents the methyl radical. Most preferably, however, $a$ is 0.

Polydiorganosiloxanes of this general formula can be prepared for example by the reaction of a trialkoxy silane or a tetra-alkoxy silane with a polysiloxane containing terminal silicon-bonded hydroxyl radicals. Preferably, such reaction should be performed in the presence of a catalyst such as an amine, or employing other suitable conditions for promoting the reaction of Si-OH+Si-OR' to liberate an alcohol. Such polydiorganosiloxanes and method for their preparation are described, for example, in U.S. Pat. No. 3,161,614, issued Dec. 15, 1964 to the Dow Corning Corporation.

For the purpose of this invention, the silicon-bonded radicals in the diorganopolysiloxane (3) can be selected from monovalent hydrocarbon radicals, monovalent halogenated hydrocarbon radicals and cyanoalkyl radicals as specified in respect of the hydroxylated diorganopolysiloxane (1) and as hereinbefore exemplified. Preferably, the organic radicals are selected from methyl, phenyl, vinyl and trifluoropropyl radicals, at least about 50 percent of the radicals being methyl radicals.

The polydiorganosiloxanes (3) vary in viscosity from freely flowing liquids having a viscosity of less than 10 cs. at 25° C. to highly viscous materials of 100,000 cs. viscosity at 25° C. or higher. Preferably, they are chosen from the lower end of the viscosity scale, that is, from about 20 to 2,000 cs. at 25° C. because the preferred catalyst compositions are those which are flowable and thus readily miscible with the contents, or a portion of the contents, of the other package. The use of the lower viscosity diorganopolysiloxanes is also advantageous in as much as they are solvents for the tin carboxylates. It is therefore possible by selection of appropriate catalysts and alkoxylated diorganopolysiloxanes to prepare a catalyst composition in the absence of compatibilizing solvents, fillers or suspension agents.

The compositions of this invention can be modified by the inclusion therein of a cross-linking agent in addition to the diorganopolysiloxane (3). Any of the polyfunctional silicon monomers or polymers known for use as cross-linking agents can be employed in this respect including, for example, organosiloxane resins, alkylhydrogen polysiloxanes, alkyl silicates and alkyl polysilicates. The most generally used and therefore preferred, are the alkyl silicates and polysilicates for example tetraethyl orthosilicate, tetra-n-propyl orthosilicate, ethyl polysilicate and isopropyl polysilicate. When employed, the additional cross-linking ingredient is preferably packaged with component (1) and can be present in proportions up to 25percent by weight based on the weight of (1). However, when this ingredient is an alkyl silicate or polysilicate is best employed in proportions of less than about 7.5 percent by weight, based on the weight of (1), if excessive cross-linking and consequently a nonelastomeric product, are to be avoided.

When the additional cross-linking agent is not present in the compositions at least a proportion of the diorganopolysiloxane (3) should preferably comprise that having a relatively low molecular weight, that is, less than about 3,000, if a high modulus elastomer is desired. The proportion of relatively low molecular weight diorganopolysiloxane can be varied widely depending on its silicon-bonded alkoxy content and on the degree of cross-linking desired in the product. Preferably, a mixture of from 30 to 70 percent by weight of an alkoxy-terminated diorganopolysiloxane having a molecular weight in the range from 700 to 2,500 with from 70 to 30 percent by weight of an alkoxy-terminated diorganopolysiloxane having a molecular weight in the range from 20,000 to 60,000 is employed.

Fillers and other additives, for example, pigments, can be present in the package containing the hydroxylated diorganopolysiloxane (1). Examples of such fillers include silicas such as fume silicas, precipitated silicas, diatomaceous earths and crushed quartz, calcium carbonate, titania, zinc oxide, zirconium silicate and ferric oxide.

When preparing vulcanizable compositions according to this invention, at least a portion of the contents of one package is mixed with at least a portion of the contents of the other package. The relative amounts employed can vary greatly depending on the proportion of tin catalyst required and the proportion present in the catalyst composition, that is, the mixture of (1) and (3). Generally, from 0.1 to about 5 percent by weight of the catalyst (2) based on the weight of (1) will be required and the proportion of the catalyst composition employed will be appropriate to such an addition. The relative proportions of the carboxylic acid salt of tin (2) and the diorganopolysiloxane (3employed in the preparation of the catalyst is not critical and will depend upon the dilution required and the proportion of the component (4) which can be tolerated in the vulcanizable composition. We have found that a catalyst composition which can be mixed readily with the components of the other package can be prepared by mixing from about 1 to about 40 parts by weight of the carboxylic acid salt of tin with every 100 parts by weight of the diorganopolysiloxane (3).

The catalyst composition, comprising components (2) and (3) is sensitive to water. It should therefore be prepared and maintained in a substantially anhydrous condition prior to use.

The following examples in which the parts are expressed as parts by weight illustrate the invention. The scope of the invention is delineated in the appended claims and is not defined or restricted by the examples.

EXAMPLE 1

100 parts of an anhydrous dimethylpolysiloxane having a viscosity of 800 cs. at 25° C. and containing terminal -$Si(OCH_2CH_2CH_3)_3$ groups was mixed thoroughly under dry conditions with 30 parts of anhydrous zinc oxide and 13 parts of dibutyltin dilaurate. This catalyst composition was charged to a flexible aluminum tube which was thereafter sealed.

A second composition was prepared by mixing 100 parts of a hydroxy end-stopped dimethylpolysiloxane having a viscosity of approximately 2,000 cs. at 25° C., 65 parts of red iron oxide, 35 parts of a diatomaceous earth and 5 parts of n-propyl orthosilicate. This second composition was charged to a closed container.

After two months, a portion of the catalyst composition was squeezed from the tube and found to be still in a flowable condition. A portion of this composition (4 parts) was then mixed thoroughly with 100 parts of the contents of the second container. The mixture was allowed to vulcanize in a shallow open mold at ambient temperature (22° C.) and relative humidity (60 percent). The mixture was converted to a rubbery mass in less than 24 hours. The tensile strength of the rubber so obtained was 4,900 $kNm^{12}$, its elongation at break 100 percent and its hardness 68° BS.

EXAMPLE 2

A composition was prepared by mixing together 100 parts of a hydroxy end-stopped dimethylpolysiloxane having a viscosity of approximately 2,000 cs. at 25° C., 10 parts of a methylhydrogen polysiloxane and 20 parts of a mixture of hydroxylated low molecular weight organosilicon compounds, 25 parts of diatomaceous earth and 4 parts of n-propyl orthosilicate.

To 100 parts of this composition was added with mixing 50 parts of the catalyst composition as prepared in example 1, the addition being carried out at ambient temperature (22° C.) and relative humidity (60 percent). The catalyzed mixture foamed immediately and was converted to a tack-free flexible foam after 5 hours.

EXAMPLE 3

A catalyst composition was prepared by mixing in the anhydrous state 7.4 parts of dibutyltin dilaurate, 60 parts of a dimethylpolysiloxane having a viscosity of approximately 60 cs. at 25° C. and 40 parts of a dimethylpolysiloxane having a viscosity of approximately 2,000 cs. at 25° C., each of the dimethylpolysiloxanes containing terminal -$Si(OCH_2CH_2CH_b)_3$ groups. The resulting composition was a clear homogeneous solution.

A second composition was prepared by mixing 100 parts of a hydroxy-terminated dimethylpolysiloxane having a viscosity of approximately 1,000 cs. at 25° C. and 3 parts of isopropyl polysilicate. These two compositions were then thoroughly mixed in a proportion of 20 parts of the catalyst composition for every 100 parts of the composition containing the hydroxylated polydimethylsiloxane. The mixture was poured immediately into a mold to a depth of 25 mm. and allowed to stand at ambient temperature and humidity (22° C. and 50 percent RH). After 16 hours, the mixture had vulcanized throughout its depth and could be readily removed from the mold as a firm transparent elastomer.

EXAMPLE 4

A catalyst composition was prepared by mixing in the anhydrous state 5 parts of impure dibutyltin dilaurate (sold as Mellite 12), 35 parts of a having a viscosity of 2,000 cs. at 25° C. and 60 parts of a dimethylpolysiloxane having a viscosity of 15 cs. at 25° C., each of the polysiloxanes containing terminal -Si(OCH$_2$CH$_2$CH$_3$)$_3$ groups. The resulting composition was a clear homogeneous solution and was stable on storage under anhydrous conditions.

A second composition was prepared by mixing 100 parts of a hydroxy end-stopped dimethylpolysiloxane having a viscosity of 3,500 cs. at 25° C., 60 parts of ground quartz, 10 parts of diatomaceous earth, 2 parts of titania and 0.5 parts of water. To 100 parts of this second composition was added with mixing 10 parts of the catalyst composition which had been stored for several weeks. After 140 minutes the mixture had thickened to twice its original viscosity and when poured into 1.6 mm. thick molds cured to a firm elastomer after 24 hours at ambient temperature and humidity (22° C., 50 percent RH).

EXAMPLE 5

When the procedure of example 4 was repeated employing in turn dibutyltin diacetate and stannous octoate in place of the dibutyltin dilaurate similar results were obtained.

EXAMPLE 6

Equivalent results were achieved when example 4 was repeated employing in place of the dimethylpolysiloxane end blocked with tripropyloxysilyl groups [-Si(OC$_3$H$_7$)$_3$] an equivalent amount of any of the following:

(CH$_3$O)$_3$SiO[(CH$_3$)$_2$SiO]$_7$Si(OCH$_3$)$_2$CH$_3$;
CH$_3$(CH$_3$CH$_2$OCH$_2$CH$_2$O)(CH$_3$O)SiO[(CH$_3$)$_2$SiO]$_9$Si(OCH$_3$)(OC$_2$H$_5$)CH$_3$;
(CH$_3$OCH$_2$CH$_2$O)$_3$SiO[(CH$_3$)$_2$SiO]$_{15}$Si(OCH$_2$CH$_2$OC$_2$H$_5$)$_3$ and
(C$_5$H$_{11}$O)$_3$SiO[(CH$_3$)$_2$SiO]$_5$Si(OC$_4$H$_9$)$_3$.

That which is claimed is:

1. A composition curable to form an elastomer upon mixing consisting essentially of (A) 100 parts by weight of an alpha, omega-dihydroxydiorganopolysiloxane wherein the organic substituents are selected from the groups consisting of monovalent hydrocarbon, monovalent halogenohydrocarbon and cyanoalkyl radicals, having a viscosity in the range from 500 to 10,000 cs. at 25° C. and 0–25 parts by weight of a crosslinking agent selected from the group consisting of alkylhydrogenpolysiloxanes, alkylsilicates and alkylpolysilicates and (B) 0.1 to 5 parts by weight of a carboxylic acid salt of tin admixed with sufficient siloxane polymer to provide 1 to 40 parts by weight carboxylic acid salt of tin per 100 parts by weight siloxane polymer, said siloxane polymer being of the general formula R$_a$(R'0)$_{3-a}$Si[OSiR''$_2$]$_n$Si(OR')$_{3-a}$R$_a$ where each R and each R'' is a monovalent hydrocarbon, halogenohydrocarbon or cyanoalkyl radical, R' is an alkyl or alkoxy alkyl radical of less than 7 carbon atoms, $a$ is 0 or 1 and $n$ has an average value such that the siloxane polymer has a viscosity in the range from 10 to 100,000 cs. at 25° C.

2. The composition of claim 1 wherein the alpha, omega-diorganopolysiloxane is a dimethylsiloxane polymer.

3. The composition of claim 2 wherein R and R'' are CH$_3$.

4. The composition of claim 2 wherein $a$ is 1, R is CH$_3$, R' is CH$_3$CH$_2$CHB2 and R'' is CH$_3$.